United States Patent
Xiao et al.

(10) Patent No.: US 10,678,065 B2
(45) Date of Patent: Jun. 9, 2020

(54) DISPLAY PANEL AND DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Wenjun Xiao, Beijing (CN); Shijun Wang, Beijing (CN); Yu Zhao, Beijing (CN); Xingyou Luo, Beijing (CN); Xi Chen, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 15 days.

(21) Appl. No.: 16/003,068

(22) Filed: Jun. 7, 2018

(65) Prior Publication Data
US 2019/0204612 A1 Jul. 4, 2019

(30) Foreign Application Priority Data

Jan. 2, 2018 (CN) .......................... 2018 1 0002847

(51) Int. Cl.
*G02B 30/27* (2020.01)
*G06F 3/01* (2006.01)
(Continued)

(52) U.S. Cl.
CPC .......... *G02B 30/27* (2020.01); *G02F 1/1368* (2013.01); *G02F 1/133514* (2013.01);
(Continued)

(58) Field of Classification Search
CPC ..... G02B 27/2214; G02B 30/27; G06F 3/013; G02F 1/155; G02F 1/133514; G02F 1/163; G02F 1/1368
(Continued)

(56) References Cited

U.S. PATENT DOCUMENTS

| | | | | |
|---|---|---|---|---|
| 2010/0220378 | A1* | 9/2010 | Moeller | G02F 1/155 359/268 |
| 2013/0335463 | A1* | 12/2013 | Chiang | G09G 3/003 345/697 |
| 2016/0341987 | A1* | 11/2016 | Chung | G02F 1/1323 |

FOREIGN PATENT DOCUMENTS

| | | |
|---|---|---|
| CN | 204178090 U | 2/2015 |
| CN | 106918956 A | 7/2017 |

OTHER PUBLICATIONS

First Chinese Office Action dated Nov. 5, 2019, received for corresponding Chinese Application No. 201810002847.1, 13 pages.

* cited by examiner

*Primary Examiner* — Charles S Chang
(74) *Attorney, Agent, or Firm* — Kinney & Lange, P.A.

(57) ABSTRACT

In one embodiment, a display panel includes: a first polarization sheet, a second polarization sheet and a liquid crystal box between the first polarization sheet and the second polarization sheet. The display panel further includes: a control electrode layer and a control module; wherein the control electrode layer is provided to the liquid crystal box, the control electrode layer comprises a plurality of separated strip electrodes, a preset pitch that satisfies a requirement of grating formation is formed between adjacent strip electrodes, and transmittances of the strip electrodes are changeable under voltage. The control module is coupled to the strip electrodes and is configured to output a voltage to the strip electrodes to change the transmittances of the strip
(Continued)

electrodes such that the control electrode layer becomes a grating or is totally transparent.

10 Claims, 2 Drawing Sheets

(51) Int. Cl.
    *G02F 1/155*     (2006.01)
    *G02F 1/1335*     (2006.01)
    *G02F 1/163*     (2006.01)
    *G02F 1/1368*     (2006.01)

(52) U.S. Cl.
    CPC .............. *G02F 1/155* (2013.01); *G02F 1/163* (2013.01); *G06F 3/013* (2013.01)

(58) Field of Classification Search
    USPC .......................................................... 349/15
    See application file for complete search history.

DISPLAY PANEL AND DISPLAY APPARATUS

CROSS-REFERENCE TO RELATED APPLICATION

This application claims priority to Chinese Patent Application No. 201810002847.1 filed on Jan. 2, 2018 in the State Intellectual Property Office of China, the disclosure of which is hereby incorporated by reference in its entirety.

TECHNICAL FIELD

The present disclosure relates to the field of display technology, and particularly, to a display panel and a display apparatus.

BACKGROUND

In daily life, people use two eyes to observe external scenery with spatial three-dimensionality. A three-dimensional (3D) display technology uses the principle of binocular stereo vision to make people acquire a three-dimensional sense of space. The main principle is to make a viewer's left eye and right eye receive different images respectively due to the positional difference caused by a distance between the two eyes of the viewer, so that two images received with "binocular parallax" constitute a pair of "stereoscopic images". Thereby, a sense of three-dimensionality is presented to the viewer by analyzing the pair of "stereoscopic images" through the brain.

SUMMARY

According to an aspect of the present disclosure, there is provided a display panel comprising: a first polarization sheet, a second polarization sheet and a liquid crystal box between the first polarization sheet and the second polarization sheet; the display panel further comprising: a control electrode layer and a control module;

wherein the control electrode layer is provided to the liquid crystal box, the control electrode layer comprises a plurality of separated strip electrodes, a preset pitch that satisfies requirement of grating formation is formed between adjacent strip electrodes, and, transmittances of the strip electrodes are changeable under voltage; and wherein the control module is coupled to the strip electrodes and is configured to output a voltage to the strip electrodes to change the transmittances of the strip electrodes such that the control electrode layer becomes a grating or is totally transparent.

In some embodiments, the control electrode layer is positioned at a side of the liquid crystal box facing the first polarization sheet, or, the control electrode layer is positioned at a side of the liquid crystal box facing the second polarization sheet.

In some embodiments, the liquid crystal box comprises an array substrate assembly, a liquid crystal layer and a color film substrate assembly overlapped in that order; and wherein the control electrode layer is positioned at a side of the array substrate assembly facing the liquid crystal layer, or, the control electrode layer is positioned at a side of the color film substrate assembly facing the liquid crystal layer.

In some embodiments, the array substrate assembly comprises a first base substrate and a TFT circuitry on the first base substrate, the control electrode layer is on the TFT circuitry and is positioned at a side of the TFT circuitry facing the liquid crystal layer.

In some embodiments, the array substrate assembly comprises a first base substrate and a TFT circuitry on the first base substrate, the control electrode layer is on the first base substrate and is positioned at a side of the first base substrate facing the TFT circuitry.

In some embodiments, the color film substrate assembly comprises a second base substrate and a color resistance structure layer on the second base substrate, the control electrode layer is on the color resistance structure layer and is positioned at a side of the color resistance structure layer facing the liquid crystal layer.

In some embodiments, the color film substrate assembly comprises a second base substrate and a color resistance structure layer on the second base substrate, the control electrode layer is on the second base substrate and is positioned at a side of the second base substrate facing the liquid crystal layer.

In some embodiments, the control module is coupled respectively to the plurality of strip electrodes, and is configured to output the voltage independently to the plurality of strip electrodes, respectively, to achieve independent controls of the transmittances of the plurality of strip electrodes.

In some embodiments, the strip electrode is made of electrochromic material.

In some embodiments, the electrochromic material comprises polyaniline doped with organic proton acid methanesulfonic acid.

In some embodiments, the control electrode layer is formed on the liquid crystal box by a plating method and a patterning process.

In some embodiments, the transmittance of the strip electrode decreases when applied voltage increases, while the transmittance of the strip electrode increases when applied voltage decreases.

In some embodiments, the display panel further comprises: an image acquisition module configured to acquire an eye movement image of a user; wherein the control module is further configured to control changes of the transmittances of at least some of the strip electrodes in accordance with an eye movement image acquired by the image acquisition module.

According to an aspect of the present disclosure, there is provided a display apparatus, comprising the display panel of any of the above embodiments.

DETAILED DESCRIPTION OF THE EMBODIMENTS

In order to provide a more clear understanding of objects, features and advantages of the present disclosure, a detailed description of technical solutions of the present disclosure and technical schemes in related art will be made as below in conjunction with specific embodiments as well as the accompanying drawings.

In the description of the present disclosure, it should be noted that, unless otherwise specified and defined definitely, orientations or positional relationships denoted by terminologies "upper", "lower", "left", "right", "inner", "outer" and the likes are those shown in the figures, and only intended for easing or simplifying the description of the present disclosure, instead of expressing or implying that the devices or elements should be positioned at specific orientations or should be configured or manipulated at specific orientations, accordingly, they are not intended to limit the scope of the present disclosure.

In the description of the embodiments of the present disclosure, it should be noted that, unless otherwise specified and defined definitely, terminologies "mount", "connect to", "connect with" and the likes should be understood and construed in a broad sense, for example, they may be a fixed connection, or a detachable connection, or an integrated connection; or, they also may be a mechanical connection or an electrical connection; or else, they can be a direct connection or an indirect connection with an intermediate medium or a communication between two elements. For those skilled in the art, the above terminologies may be understood and construed in specific situations in the present disclosure.

In related art, a display device that realizes naked eye three-dimensional display is provided with a grating structure. The grating structure mainly comprises a fixed grating and a liquid crystal grating.

Figure 1:
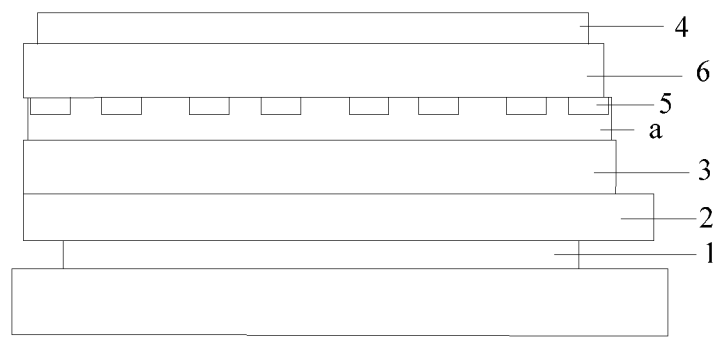
FIG. 1 is a schematic view showing a structure of a display panel in related art.
Figure 2:
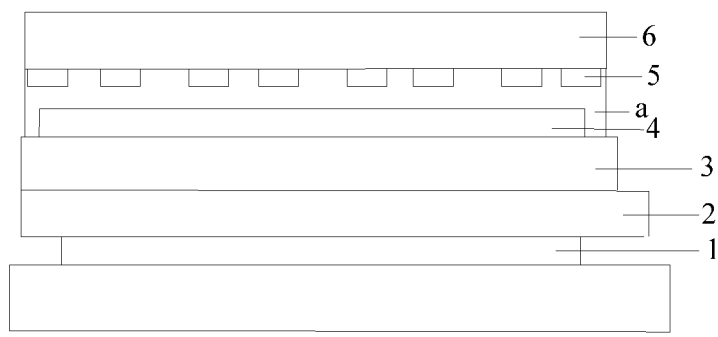
FIG. 2 is a schematic view showing another structure of a display panel in related art.

FIG. 1 and FIG. 2 show configurations of a liquid crystal display (LCD) panel. The display panel comprises a lower polarization sheet 1, an array substrate assembly 2, a liquid crystal layer, a color film substrate assembly 3, an upper polarization sheet 4, a fixed grating 5 and a grating protection layer 6. The fixed grating 5 may be on a side of the color film substrate assembly 3 closing to the grating protection layer 6, and is mounted between the color film substrate assembly 3 and the grating protection layer 6 by an optical adhesive layer a, as shown in FIG. 1. The fixed grating 5 may also be on a side of the upper polarization sheet 4 away from the color film substrate assembly 3, and is mounted between the upper polarization sheet 4 and the grating protection layer 6 by an optical adhesive layer a, as shown in FIG. 2. However, regardless of the structure shown in FIG. 1 or FIG. 2, due to provision of the fixed grating 5, the display panel can only perform a three-dimensional (3D) display, but cannot perform a two-dimensional (2D) display, and cannot achieve a switching between the 2D display and the 3D display.

Figure 3:
FIG. 3 is a schematic view showing yet another structure of a display panel in related art.

FIG. 3 shows another configuration of a liquid crystal display (LCD) panel. The display panel comprises a lower polarization sheet 1, an array substrate assembly 2, a liquid crystal layer, a color film substrate assembly 3, an upper polarization sheet 4, a liquid crystal grating box 7 and a grating polarization sheet 8 overlapped in that order. The liquid crystal grating box 7 comprises a lower base substrate 71, a liquid crystal grating layer and an upper base substrate 72 overlapped in that order, and the liquid crystal grating box 7 is between the upper polarization sheet 4 and the grating polarization sheet 8. Due to provision of the liquid crystal grating box 7, the display panel achieves a switching between the 2D display and the 3D display. However, a distance H between the liquid crystal grating layer and a pixel layer in the display panel is large, which results in a large distance between two adjacent pixels. As a result, the pixel density of the display panel provided with the liquid crystal grating box 7 is low, and the display effect is poor.

Specific implementations of the present disclosure are further described in detail below with reference to the accompanying drawings and embodiments. The following embodiments are intended to illustrate the present disclosure, but not to limit the scope of the present disclosure.

According to embodiments of the present disclosure, there is provided a display panel. The display panel comprises: a first polarization sheet, a second polarization sheet and a liquid crystal box between the first polarization sheet and the second polarization sheet. The display panel further comprises: a control electrode layer and a control module. The control electrode layer is provided to the liquid crystal box, the control electrode layer comprises a plurality of separated strip electrodes, a preset pitch that satisfies requirement of grating formation is formed between adjacent strip electrodes, and, transmittances of the strip electrodes are changeable under voltage. The control module is coupled to the strip electrodes and is configured to output a voltage to the strip electrodes to change the transmittances of the strip electrodes such that the control electrode layer becomes a grating or is totally transparent.

According to embodiments of the present disclosure, the voltage applied to the strip electrodes can be controlled to decrease transmittances of the strip electrodes so that the strip electrodes are non-transparent and thus the control electrode layer becomes a grating. Thereby the display panel performs a 3D display. The voltage applied to the strip electrodes can also be controlled to increase transmittances of the strip electrodes so that the strip electrodes are transparent and thus the control electrode layer is totally transparent Thereby the display panel performs a 2D display. Because the control electrode layer is provided to the liquid crystal box and thickness of the control electrode layer is relatively small, a distance between the grating layer and the pixel layer of the display panel becomes smaller compared to the distance H between the liquid crystal grating layer and a pixel layer in the related art display panel, as a result, the display panel has increased pixel density and improved display effect.

According to embodiments of the present disclosure, size of the strip electrodes and the preset pitch between two adjacent strip electrodes may be set according to actual requirements. For example, size of the strip electrodes and the preset pitch between two adjacent strip electrodes may be set according to size of a grating to be formed. The strip electrodes have the property that their transmittance changes under voltage. The relationship between magnitude of the voltage and the size of the transmittance may vary. For example, when the applied voltage increases, the transmittance of the strip electrodes decreases; or when the applied voltage increases, the transmittance of the strip electrodes increases. For the strip electrodes made of different materials, there are different correspondences.

According to embodiments of the present disclosure, there may be various materials for the strip electrodes, such as electrochromic material. There may be various electrochromic materials, such as polyaniline electrochromic material. In one embodiment, the electrochromic material is powder of polyaniline doped with organic proton acid methanesulfonic acid, of which the reaction speed is very fast, and is of the order of magnitude of microseconds. In a 2D display, the polyaniline electrochromic material is not electrified and is transparent, i.e., the strip electrodes are transparent; while, in a 3D display, the polyaniline electrochromic material undergoes color change to opaqueness after being energized, i.e., the strip electrodes are opaque to form opaque areas in the control electrode layer, thereby the control electrode layer having the opaque areas and transparent areas becomes a grating.

In the embodiments of the present disclosure, herein, only some materials for the strip electrodes are exemplified, however, it is not limited to this, and any other suitable materials may be used according to the embodiments of the present disclosure. In addition, thickness of the strip electrodes can be set according to actual conditions.

According to embodiments of the present disclosure, there are many ways to manufacture the strip electrodes from the electrochromic material. For example, a layer of electrochromic material is formed on the liquid crystal box by plating, and then a patterning process is implemented, to obtain the strip electrodes having a desired structure. The ways to manufacture the strip electrodes may be set according to actual requirements.

Positional relationship of the control electrode layer to the liquid crystal box can vary. For example, the control electrode layer may be positioned outside the liquid crystal box. In a first configuration, the control electrode layer may be positioned at a side of the liquid crystal box facing the first polarization sheet. Or, in a second configuration, the control electrode layer is positioned at a side of the liquid crystal box facing the second polarization sheet. The first polarization sheet may be an upper polarization sheet, while the second polarization sheet is a lower polarization sheet; or, the first polarization sheet may be a lower polarization sheet, while the second polarization sheet is an upper polarization sheet.

Figure 4:
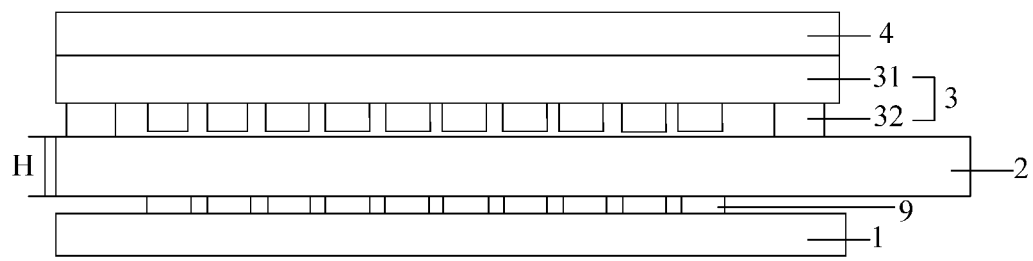
FIG. 4 is a schematic view showing a structure of a display panel according to an embodiment of the present disclosure.

For the above first configuration, the first polarization sheet is a lower polarization sheet and the second polarization sheet is an upper polarization sheet. Referring to FIG. 4, the display panel comprises a lower polarization sheet 1, a control electrode layer 9, an array substrate assembly 2, a liquid crystal layer, a color film substrate assembly 3 and an upper polarization sheet 4 overlapped in that order. The color film substrate assembly 3 comprises a base substrate 31 and a color resistance structure layer 32. A distance H between the control electrode layer 9 and the color resistance structure layer 32, in particular a distance H between the control electrode layer 9 and a pixel layer of the color resistance structure layer 32, about equals to a thickness of a base substrate of the array substrate assembly 2, while the latter has a minimal thickness up to 0.15 mm. In an example, the distance H is 0.15 mm, and the number of viewpoints is kept at 2 without reducing a 3D display resolution, it is calculated that a distance between two adjacent pixels, namely a pixel distance, is 19 μm, the pixel density is about 1300 PPI. Thus, the display panel has increased pixel density and improved display effect. It should be noted that, the number of viewpoints is quantity of pixels falling into the range of the pupil distance. The more the number of viewpoints is, the greater the distance between two adjacent gratings is.

Figure 5:
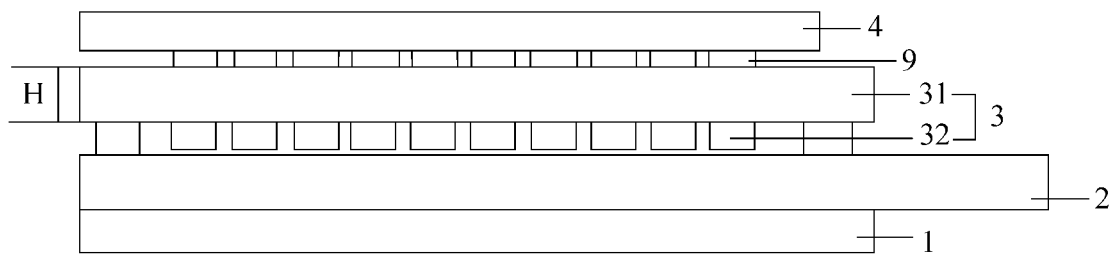
FIG. 5 is a schematic view showing another structure of a display panel according to an embodiment of the present disclosure.

For the above second configuration, the first polarization sheet is a lower polarization sheet and the second polarization sheet is an upper polarization sheet. Referring to FIG. 5, a distance H between the control electrode layer 9 and the pixel layer about equals to a thickness of the base substrate 31 of the color film substrate assembly 3, while the latter may be substantially the same as thickness of the base substrate of the array substrate assembly 2. As a result, the display panel has increased pixel density and improved display effect.

In the above first and second configurations, the control module 81 can be provided to a non-display region of the array substrate 2.

The liquid crystal box comprises an array substrate assembly, a liquid crystal layer and a color film substrate assembly overlapped in that order. The control module is coupled to the liquid crystal box, and is configured to output voltage to the liquid crystal box so as to control an image outputting of the liquid crystal box. Positional relationship of the control electrode layer to the liquid crystal box may further include the following positional relationships. The control electrode layer is positioned inside the liquid crystal box. In particular, a first positional relationship is that the control electrode layer is positioned at a side of the array substrate assembly facing the liquid crystal layer, while, a second positional relationship is that the control electrode layer is positioned at a side of the color film substrate assembly facing the liquid crystal layer.

The array substrate assembly comprises a first base substrate and a TFT (Thin Film Transistor) circuitry on the first base substrate. For the above first positional relationship, the control electrode layer is on the TFT circuitry and is positioned at a side of the TFT circuitry facing the liquid crystal layer, or, the control electrode layer is on the first base substrate and is positioned at a side of the first base substrate facing the TFT circuitry.

The color film substrate assembly comprises a second base substrate and a color resistance structure layer on the second base substrate, and the color resistance structure layer comprises a color resistance layer and a black matrix. For the above second positional relationship, the control electrode layer is on the color resistance structure layer, and is positioned at a side of the color resistance structure layer facing the liquid crystal layer, or, the control electrode layer is on the second base substrate, and is positioned at a side of the second base substrate facing the liquid crystal layer.

Since the control electrode layer is inside the liquid crystal box, a distance between the grating layer and the pixel layer is small, which results in increased pixel density and improved display effect of the display panel.

In the display panel according to the embodiments of the present disclosure, the control module is coupled to the plurality of strip electrodes respectively, to output voltages independently to the plurality of strip electrodes so as to achieve independent control of the respective transmittances of the plurality of strip electrodes. In a specific implementation, the control module may output different voltages to the plurality of strip electrodes, or may output voltages to some of the strip electrodes, so that the strip electrodes in different areas of the display panel have different transmittances. As a result, a control of partition display including the 3D image and the 2D image is achieved for the display panel, which further enriches the display function of the display panel.

It should be noted that, although the liquid crystal layer and/or the liquid crystal grating layer in the related art and in the present disclosure are not shown in FIGS. 1-5, in the LCD display panel provided in related art, for one example, in the configuration of FIG. 1 and FIG. 2, the liquid crystal layer is positioned between the array substrate assembly 2 and the color film substrate assembly 3; for another example, in the configuration of FIG. 3, the liquid crystal grating layer is positioned between the upper base substrate 71 and the lower base substrate 72; in the LCD display panel provided according to the present disclosure, for yet another example, in the configuration of FIG. 4 and FIG. 5, the liquid crystal layer is positioned between the array substrate assembly 2 and the color film substrate assembly 3.

Figure 6:
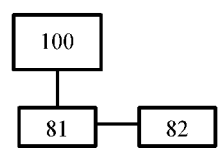
FIG. 6 is a block diagram showing functional modules of a display panel according to an embodiment of the present disclosure.

The display panel according to embodiments of the present disclosure may further be configured with an eye tracking function. As shown in FIG. 6, the display panel 100 includes a control module 81 and an image acquisition module 82. When the control module 81 receives an eye image acquired by the image acquisition module 82, such as a camera, and determines the eye's viewing area of the display panel 100 according to the eye image, the control module 81 controls the transmittance of the strip electrodes in the viewing area of the display panel 100 to decrease, so that the display panel performs a 3D display in the viewing area while performing a 2D display in the rest areas.

According to embodiments of the present disclosure, there is further provided a display apparatus. The display apparatus comprises the display panel according to any one of the abovementioned embodiments of the present disclosure. Due to configuration and performance of the display panel, the display apparatus has a switching function between a 2D display and a 3D display, and thus has good display performance including clear image display.

These embodiments in this description are described in a progressive manner, and each embodiment focuses on the differences from other embodiments, and the same or similar parts among these embodiments can be referred to each other.

Although the disclosed embodiments of the present disclosure have been shown and described as above, the contents described are merely embodiments for facilitating the understanding of the present disclosure and are not intended to limit the present disclosure. It will be apparent, however, for those skilled in the art that modifications and changes on the forms and details may be made in these embodiments without departing from the principles and spirit of the present disclosure, the scope of which is defined in the attached claims.

What is claimed is:

1. A display panel comprising:
a first polarization sheet;
a second polarization sheet;
a liquid crystal box between the first polarization sheet and the second polarization sheet; and
a control electrode layer and a control module;
wherein the control electrode layer is provided to the liquid crystal box, the control electrode layer comprises a plurality of separated strip electrodes, a preset pitch that satisfies a requirement of grating formation is formed between adjacent strip electrodes, and transmittances of the strip electrodes are changeable under voltage;
wherein the control module is coupled to the strip electrodes and is configured to output a voltage to the strip electrodes to change the transmittances of the strip electrodes such that the control electrode layer becomes a grating or is totally transparent;
wherein the liquid crystal box comprises an array substrate assembly, a liquid crystal layer and a color film substrate assembly overlapped in that order; and the control electrode layer is positioned at a side of the array substrate assembly facing the first polarization sheet, or the control electrode layer is positioned at a side of the color film substrate facing the second polarization sheet;
wherein the strip electrodes are made of electrochromic material, the electrochromic material comprises polyaniline doped with organic proton acid methanesulfonic acid; and
wherein the display panel comprises:
a 2D display, wherein the polyaniline electrochromic material is not electrified and is transparent, so that the strip electrodes are transparent; or
a 3D display, wherein the polyaniline electrochromic material undergoes color change to opaqueness after being energized, such that the strip electrodes form opaque areas upon being energized in the control electrode layer, to cause the control electrode layer to include the opaque areas and transparent areas that together form a grating.

2. The display panel of claim 1, wherein the array substrate assembly comprises a first base substrate and a TFT circuitry on the first base substrate, and the control electrode layer is on the TFT circuitry and is positioned at a side of the TFT circuitry facing the liquid crystal layer.

3. The display panel of claim 1, wherein the array substrate assembly comprises a first base substrate and a TFT circuitry on the first base substrate, and the control electrode layer is on the first base substrate and is positioned at a side of the first base substrate facing the TFT circuitry.

4. The display panel of claim 1, wherein the color film substrate assembly comprises a second base substrate and a color resistance structure layer on the second base substrate, and the control electrode layer is on the color resistance structure layer and is positioned at a side of the color resistance structure layer facing the liquid crystal layer.

5. The display panel of claim 1, wherein the color film substrate assembly comprises a second base substrate and a color resistance structure layer on the second base substrate, and the control electrode layer is on the second base substrate and is positioned at a side of the second base substrate facing the liquid crystal layer.

6. The display panel of claim 1, wherein the control module is coupled respectively to the plurality of strip electrodes, and is configured to output the voltage independently to the plurality of strip electrodes, respectively, to achieve independent controls of the transmittances of the plurality of strip electrodes.

7. The display panel of claim 1, wherein the control electrode layer is formed on the liquid crystal box by a plating method and a patterning process.

8. The display panel of claim 1, wherein the transmittance of the strip electrodes decreases when applied voltage increases, while the transmittance of the strip electrodes increases when applied voltage decreases.

9. The display panel of claim 1, further comprising: an image acquisition module configured to acquire an eye movement image of a user;
wherein the control module is further configured to control changes of the transmittances of at least some of the strip electrodes in accordance with an eye movement image acquired by the image acquisition module.

10. A display apparatus, comprising the display panel of claim 1.

* * * * *